April 21, 1964

T. L. JOHNSTON ETAL 3,129,497

BERYLLIUM METAL PRODUCTS

Filed May 12, 1960

INVENTORS
THOMAS L. JOHNSTON
CHOH H. LI
BY
*Frederick E. Lange*
ATTORNEY

United States Patent Office 3,129,497
Patented Apr. 21, 1964

3,129,497
BERYLLIUM METAL PRODUCTS
Thomas L. Johnston and Choh Hsien Li, Hopkins, Minn., assignors to Minneapolis-Honeywell Regulator Company, Minneapolis, Minn., a corporation of Delaware
Filed May 12, 1960, Ser. No. 28,732
4 Claims. (Cl. 29—182.5)

The present invention relates to a body of beryllium metal containing hard spheroidized particles of a non-reactive, insoluble material. Specifically, this invention relates to an improved beryllium metal product possessing superior machineability, ductility, and strength without loss of other desirable properties inherent in beryllium metal.

It is well known in the art today that beryllium metal possesses highly desirable properties for use in precision parts where low mass, high structural strength, and dimensional stability are desired. An example of such an application would be in gimbals and rotors for aircraft and missile gyroscopes. However, beryllium metal has the undesirable property of being extremely brittle and intricate shapes are difficult to machine. Beryllium metal is, due to its brittle nature, fracture prone. Because of the brittle nature of the beryllium, precision machining particularly on sharp edges, results in high rejection rates due to the breaking of the edges. The cost per individual part is very high and rejection of a part in any stage in processing is very expensive.

We have discovered that machining properties, ductility, and strength of beryllium metal can be markedly improved using the material of the present invention. Further, the desirable properties, enumerated above, of beryllium are not adversely affected by the invention.

Briefly, the invention consists of incorporating into the beryllium metal hard spheroidized particles of a nonreactive, insoluble material, said material consisting of particles less than 10 microns in diameter, comprising from 2% to 8% by volume of the finished product.

Therefore, it is the object of the present invention to provide a beryllium metal product possessing superior machineability.

It is the further object to provide a beryllium metal product possessing superior ductility.

It is the further object to provide a beryllium metal product possessing superior strength.

Other and further objects of the present invention will become apparent upon a study of the following specification, claims, and accompanying drawings, wherein:

Figure 1:
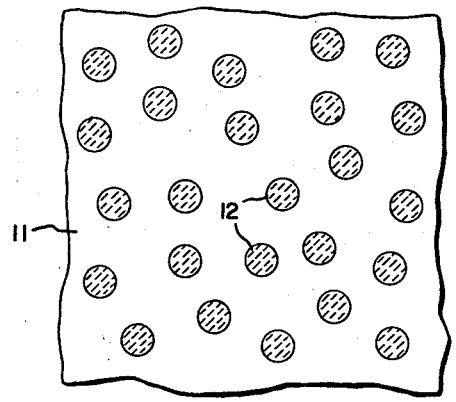
FIGURE 1 is a diagrammatic representation of a beryllium sample prepared in accordance with the present invention.

According to the preferred process for the present invention, a powdered hard refractory substance, which is not reactive with or soluble in beryllium metal at the sintering temperature, for example alumina, is spheroidized and classified according to particle size. Particles falling below about 10 microns in diameter are selected and employed in the subsequent steps of the invention. The selected spheroidized particles are then blended with finely powdered beryllium metal of −200 mesh (−200 mesh includes all particles which pass through a 200 mesh screen) particle size in a ball mill, or any other appropriate method of mechanically mixing, and the mixture is subsequently sintered under heat and pressure to form an essentially void free product. It has been found that the results achieved using spherical particles above 10 micron size are inferior to those results achieved using particles below 10 micron. The beryllium powder added thereto must be −200 mesh or less to provide compatibility in blending—i.e. prevent segregation. Spheroidizing of the alumina or equivalent to form hard, nonreactive, insoluble particles may be done in any manner which results in a substantially spherical end product. Several methods are known in the art today. The preferred method is that shown in the application of Huegel et al., Serial No. 705,207, now abandoned, filed December 26, 1957, and assigned to the same assignee as the present invention.

In ordinary beryllium metal not made in conformance with the present invention, a number of related undesirable properties exist which tend to act as a deterrent to use of beryllium metals in applications where its desirable properties are needed. These undesirable properties includes poor or difficult machineability, low strength, lack of ductility for ordinary forming operations, and notch brittleness. These undesirable properties are felt to be related, inasmuch as identical phenomena contribute to each of them.

Beryllium, having a hexagonal close packed structure, is capable of deforming by shear over the basal (0001) and prismatic (10$\overline{1}$0) planes. At low temperatures, shear occurs preferentially on the basal planes. In a sintered polycrystalline beryllium product with no preferred crystal orientation, basal shear quickly leads to the nucleation of cleavage cracks and subsequent failure with very limited ductility. A fine grain size limits the size of microcracks introduced by deformation, increases both the fracture stress and the degree of ductility. Grain growth during processing and fabrication of beryllium can be minimized and controlled by inclusion of 2% to 8% by volume of a dispersion of a hard refractory substance of less than 10 micron particle size during formation of the raw mass of beryllium. We have found that unless the refractory substance is essentially spherical in form the desired effect is not achieved. We have further found that optimum properties are achieved using 4% by volume of the refractory substance.

The results found upon addition of the refractory spherical particles to beryllium were not within the framework of results to be expected on the basis of other hard phase filled materials. For example, in ordinary dispersion strengthened materials, it has been found that the addition of hard phase materials to ductile matrices which normally exhibit a fibrous type of fracture has resulted in a greater brittleness and a resulting lack of ductility. With a material such as beryllium, which normally exhibits a cleavage type of fracture, the results to be expected upon addition of a hard phase material would be an even greater brittleness and lack of ductility. From previous experience, it would thus appear that the addition of hard, insoluble particles would be directly contra to the best interest of obtaining a machineable, ductile material. However, these results were not experienced upon addition of spherical particles of a ceramic. To the contrary, the result has been a beryllium product of greatly improved over-all properties. From the discussion below, it appears that other materials which are brittle in the pure form could similarly be improved by the addition of a small quantity of spherical ceramic particles.

Referring now to the accompanying drawings, FIGURE 1 shows a diagrammatic representation of a section of a metal made in accordance with the invention. The illustration represents the case of 10 micron particles comprising 8% by volume of the matrix metal. An actual sample prepared in accordance with the invention would contain particles of various diameters below 10 micron. 11 generally designates a beryllium matrix with particles 12 of a hard refractory substance dispersed therein. As can be seen, the particles are all spherical or essentially spherical in form. The particles shown are 10 microns in diameter and comprise in volume 8% of the matrix metal. This figure shows the relationship of inter-particle distance to particle size for this case.

Figure 2:
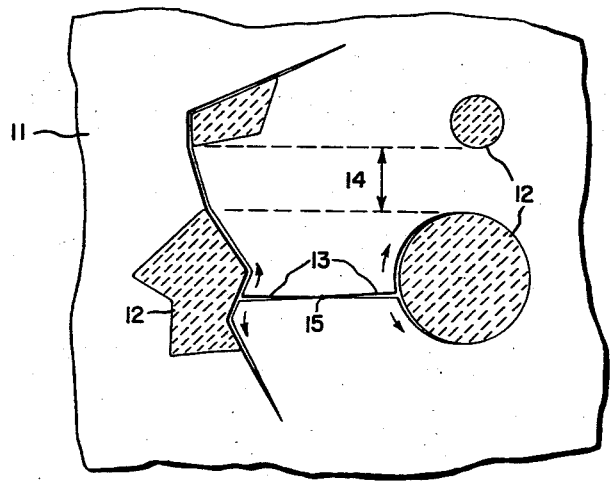
FIGURE 2 is a schematic representation of the influence of particle shape on fracture path.

Referring now to FIGURE 2, 11 generally designates a beryllium matrix with particles 12 of a hard refractory substance dispersed therein. These particles are below 10 microns in diameter and comprise from 2% to 8% by volume of the matrix metal. 13 represents a crack originating at point 15 propagated within the matrix material. 14 represents inter-particle regions of matrix metals only. As the crack 13 propagates through the matrix material, it comes into contact with particle 12. The cracks then proceed in the direction of the arrows, following the surface of the particles generally designated 12. In the case of the irregularly shaped particle as the crack propagates into the matrix in the zone designated 14, the matrix cannot be deformed because the shear stresses between the particles and region 14 are reduced to zero. In the case of the spherical particles, as the inter-facial crack approaches the zone designated 14, flow can occur in the partially strained matrix between the neighboring spherical particles. Thus the strain is relieved and the strength and ductility of the mass is improved.

Having thus described the results to be obtained from our invention, the following examples show preferred methods of manufacturing.

EXAMPLE 1

Spheroidized aluminum oxide particles below 10 microns in diameter are intimately dispersed with —325 mesh beryllium metal powder. The quantity of aluminum oxide may range from 2% to 8% by volume of the beryllium metal. The dispersing is accomplished by ball milling for 12 to 16 hours. The resulting powder is then put into a graphite mold and the mold and powdered metal evacuated by a fore-pump to approximately from 1 to 3 microns pressure of mercury. The mold and powder are then heated to 1000° C. by an induction heater and 2000 p.s.i. pressure applied to the powder by means of a ram to effect sintering. Application of heat is then discontinued and the system allowed to cool at a rate as rapid as the furnace system permits. Upon reaching room temperature, the vacuum is released and the resulting billet removed from the mold. It should be noted that any graphite from the mold which has penetrated the surface of the beryllium billet must be removed by machining to prevent corrosion upon long exposure to moist air.

EXAMPLE 2

Minus three twenty-five mesh beryllium metal powder is blended as in Example I with aluminum oxide particles below 10 microns in size, said particles previously shaped to an essentially spherical form. The aluminum oxide is added in a quantity equivalent to 4% by volume of that of the beryllium. The resulting powder is placed in a graphite mold and heated to from 900° C. to 1100° C. and 1000 p.s.i. applied after the system is first evacuated to less than 3 microns of mercury pressure. Cooling and removing the product from the mold are the same as in Example 1.

The above examples are not to be construed as limiting the materials usable as a spheroidized ceramic. Any ceramic material capable of being spheroidized and being essentially non-reactive with and insoluble in beryllium at elevated temperatures is suitable. The improvement, as discussed above, is believed to be purely one of physical structure and not dependent on reaction of the beryllium with the hard phase. Metals, as well as ceramic materials, should prove usable as the spherical phase. The only requirements which must be met are that the spherical phase be non-reactive with and insoluble in beryllium at elevated temperatures, be a solid at the forming temperature, and be capable of being spheroidized. Further, the process is not to be considered limited to powdered metal techniques. The spherical particles can be blended into a liquid beryllium metal, although this technique is more difficult to operate than conventional powder metallurgy techniques.

We have found that the ductility of beryllium products prepared in accordance with the invention show deflection before fracture up to 8 times as great as that shown by many forms of commercially available sintered beryllium metal. In addition, we have found that the strength of the beryllium metal made in accordance with our invention shows a marked increase. For example test samples prepared in accordance with Example 1 and having dimension .170 inch square by 1 inch long, when tested in a three point bend test using ⅛ inch diameter load applying bars, gave values as follows:

Table I.—Hot Pressed Beryllium

| Material: | Tensile strength, p.s.i. |
|---|---|
| QMV [1] | 59,500 |
| 2% spheres, 98% Be | 73,800 |
| 4% spheres, 94% Be | 78,000 |
| 8% spheres, 92% Be | 62,300 |

[1] Commercial beryllium from brush beryllium. Typical sample includes approximately 1% BeO.

The formula used for calculating the fracture stress reported in the above table is:

$$\frac{3}{bd^2}W\left(\frac{L}{2}-z\right)$$

When $b$ is the width; $d$, the depth; $W$, the applied stress; $L$, the distance between the farthest supports; and $z$, zero, if $W$ is applied midway between the two farthest supports.

Forged materials show a similar increase in their properties when tested in the two directions of anisotropy. Typical results are given in the table below.

Table II

FORGED-HOT PRESSED BERYLLIUM

| Material | Direction | Tensile Strength, p.s.i. |
|---|---|---|
| 100% beryllium prepared in same manner as Example 1 | horizontal | 80,500 |
| | vertical | 64,000 |
| 2% spheres, 98% Be | horizontal | 80,000 |
| | vertical | 63,700 |
| 4% spheres, 96% Be | horizontal | 94,900 |
| | vertical | 68,945 |

In addition to the above tests defining specific properties such as ductility and strength, samples containing 2, 4, and 8% by volume of alumina spheres prepared in accordance with Example 1 were machined to determine the relative improvement obtained using material of the invention. The ease or difficulty of machining of a sample is difficult to describe in precise values, however, it has been found that samples using the invention proved easier to machine than pure beryllium samples. The samples of the invention gave fine powdery chips, rather than a continuous curling chip, and caused approximately 25% less tool wear than pure beryllium samples. Edge breakage on sharp corners was also greatly reduced.

Having thus described our invention, what we desire to obtain by Letters Patent is:

1. A beryllium metal product comprising a fine grained beryllium metal and from about 2% up to about 8% by volume of said beryllium metal of insoluble, non-reactive to beryllium at its sintering temperature, substantially spheroidized refractory particles, said particles being less than 10 microns in diameter, said product characterized in possessing greater strength, ductility, and machineability than beryllium metal of substantially the same chemical composition.

2. A beryllium metal product comprising a fine grained beryllium metal and about 4% by volume of said beryllium metal of insoluble, non-reactive to beryllium at its sintering temperature, substantially spheroidized refractory particles, said particles being less than 10 microns in diameter, said product characterized in possessing greater strength, ductility, and machineability than beryllium metal of substantially the same chemical composition.

3. A beryllium metal product comprising a fine grained beryllium metal having intimately dispersed therethrough from about 2% up to about 8% by volume of alumina in substantially spherical form, said alumina consisting of particles of less than 10 microns in diameter, said product characterized in possessing greater strength, ductility, and machineability than beryllium metal of substantially the same chemical composition.

4. A beryllium metal product comprising a fine grained beryllium metal having intimately dispersed therethrough about 4% by volume of said beryllium metal of alumina in substantially spherical form, said alumina being present in particles of a size below about 10 microns in diameter, said product characterized possessing greater strength, ductility, and machineability than beryllium metal of substantially the same chemical composition.

References Cited in the file of this patent

UNITED STATES PATENTS

| | | |
|---|---|---|
| 2,725,288 | Dodds et al. | Nov. 29, 1955 |
| 2,818,339 | Dodds | Dec. 31, 1957 |
| 2,823,988 | Grant et al. | Feb. 18, 1958 |
| 2,972,529 | Alexander et al. | Feb. 21, 1961 |

OTHER REFERENCES

"Proceedings of the Third Plansee Seminar," pp. 454–463, publ. 1959.